United States Patent [19]

Wittmann et al.

[11] Patent Number: 4,987,184

[45] Date of Patent: Jan. 22, 1991

[54] MIXTURES OF POLYCARBONATES WITH SILOXANE-CONTAINING GRAFT POLYMERS

[75] Inventors: Dieter Wittmann, Krefeld; Christian Lindner, Cologne; Volker Damrath, Burscheid, all of Fed. Rep. of Germany; Hans-Jürgen Kress, Pittsburgh, Pa.; Horst Peters, Leverkusen; Jochen Schoeps, Krefeld, both of Fed. Rep. of Germany

[73] Assignee: Bayer AG, Leverkusen-Bayerwerk, Fed. Rep. of Germany

[21] Appl. No.: 496,435

[22] Filed: Mar. 20, 1990

Related U.S. Application Data

[63] Continuation of Ser. No. 266,784, Nov. 3, 1988, Pat. No. 4,948,837.

[30] Foreign Application Priority Data

Nov. 10, 1987 [DE] Fed. Rep. of Germany ....... 3738109

[51] Int. Cl.$^5$ .............................................. C08G 63/48

[52] U.S. Cl. ......................................... 525/63; 525/67; 264/331.15; 264/331.16; 264/331.17; 264/331.18

[58] Field of Search .............. 525/63, 67; 264/331.15, 264/331.16, 331.17, 331.18

[56] References Cited

U.S. PATENT DOCUMENTS

| | | | |
|---|---|---|---|
| 4,683,265 | 7/1987 | Kress et al. | 525/67 |
| 4,806,595 | 2/1989 | Kress et al. | 525/63 |
| 4,812,515 | 3/1989 | Kress et al. | 525/63 |
| 4,948,837 | 8/1990 | Wittmann et al. | 525/63 |

Primary Examiner—Melvyn I. Marquis
Attorney, Agent, or Firm—Connolly and Hutz

[57] ABSTRACT

The invention relates to thermoplastic polycarbonate molding compositions containing polycarbonates, special siloxane-containing graft polymers and, optionally, lower thermoplasts and/or standard additives and to a process for the production of the polycarbonate molding compositions.

2 Claims, No Drawings

MIXTURES OF POLYCARBONATES WITH SILOXANE-CONTAINING GRAFT POLYMERS

This is a continuation of Ser. No. 266,784, filed Nov. 3, 1988 now Pat. No. 4,948,837.

Mixtures of thermoplastic polycarbonates with graft polymers have long been known. Depending on the structure of the graft polymers, however, there is a need for improvement in resistance to ageing and weathering on the one hand and in low-temperature impact strength on the other hand in order to promote external application to an even greater extent, above all in the automotive industry.

According to EP-OS 0 135 794 (Le A 22 390), the polycarbonate component may be modified by incorporation of siloxane blocks in the polycarbonate component which, above all, increases toughness, particularly at low temperatures, and improves burning behavior (cf. for example page 15 of EP-OS 0 135 794). Despite favorable toughness at low temperatures, however, there are certain disadvantages arising out of the particular graft polymer components used.

EP-OS 0 022 979 and US-PS 4,305,856 describe polycarbonate/ABS mixtures to which a silidone is added in quantities of 0.05 to 3% by weight to improve mold release.

DE-OS 26 59 357 describes high-impact thermoplastic molding compositions containing 1 to 50 parts by weight of an elastomeric graft polymer obtained by polymerization of unsaturated monomers in the presence of organopolysiloxanes and/or silicone rubbers to 100 parts by weight of a thermoplastic plastic, for example polycarbonate.

According to DE-OS 26 59 357, the molding compositions show high low-temperature impact strength combined with high resistance to weathering and ageing, high surface quality, a pure natural color and high color stability without any significant deterioration in the original properties of the thermoplastic plastic (page 3, last paragraph of DE-OS 26 59 357).

EP-OS 0 034 748 (Le A 20 199) also describes high-impact polymers showing improved weather resistance which, in addition, may be mixed with thermoplastic polycarbonates and with polymethacrylates (cf. EP-OS 0 089 540/Le A 21 498). However, molding compositions such as these show unsatisfactory toughness at low temperatures for certain applications.

It has now been found that the property spectrum can be optimized in regard to low-temperature toughness and resistance to ageing and weathering by using graft polymers of silicone rubbers which, in turn, are prepared in the presence of a resin-like polymer having a softening temperature (glass temperature) above 30° C., preferably above 60° C. and more preferably above 90° C.

Accordingly, the present invention relates to thermoplastic polycarbonate molding compositions containing
(A) 52 to 94% by weight and preferably 60 to 86% by weight of one or more polycarbonates and
(B) 6 to 48% by weight and preferably 14 to 40% by weight of one or more particulate graft polymers which are characterized in that the graft polymers can be prepared from
B.1 20 to 90 parts by weight, preferably 30 to 80 parts by weight and more preferably 45 to 75 parts by weight of a polymer graft overlay of at least one $\alpha,\beta$-unsaturated, olefinic monomer on
B.2 80 to 10 parts by weight, preferably 70 to 20 parts by weight and more preferably 55 to 25 parts by weight of a graft base having a core/shell structure, consisting of a core (a) of organic, resin-like polymer of olefinically unsaturated monomers having a glass temperature (Tg) above 30° C., preferably above 60° C. and more preferably above 90° C. and a shell polymer (shell) (b) of crosslinked silicone rubber, the ratio by weight of the core (a) to the shell (b) being from 0.1:99.9 to 90:10 and preferably from 10:90 to 50:50 and the graft polymers (B) having an average particle diameter ($d_{50}$) of from 0.05 $\mu$m to 10 $\mu$m, preferably from 0.1 $\mu$m to 2 $\mu$m and more preferably from 0.1 to 1 $\mu$m and the sum of the parts by weight of B.1 and B.2 always being 100 parts by weight.

The polycarbonates of component (A) are thermoplastic, aromatic polycarbonates obtained by reaction of diphenols, particularly dihydroxydiaryl alkanes, with phosgene or diesters of carbonic acid. In addition to the unsubstituted dihydroxydiaryl alkanes, those of which the aryl radicals carry methyl groups or halogen atoms in the o- and/or m-position to the hydroxyl group are also suitable. Branched polycarbonates are also suitable.

The polycarbonates of component (A) have weight average molecular weights $\overline{M}w$ of from 10,000 to 200,000 and preferably from 20,000 to 80,000, as determined for example by ultracentrifugation or scattered light measurement.

Suitable diphenols are, for example, hydroquinone, resorcinol, 4,4'-dihydroxydiphenyl, bis-(hydroxyphenyl)-alkanes, such as for example $C_1$–$C_8$ alkylene and $C_2$–$C_8$ alkylidene bisphenols, bis-(hydroxyphenyl)-cycloalkanes, such as for example $C_5$–$C_{15}$ cycloalkylene and $C_5$–$C_{15}$ cycloalkylidene bisphenols, bis-(hydroxyphenyl)-sulfides, ethers, ketones, sulfoxides or sulfones. Other suitable diphenols are $\alpha$-$\alpha'$-bis-(hydroxyphenyl)-diisopropylbenzene and also the corresponding nucleus-alkylated and nucleus-halogenated compounds. Preferred polycarbonates are based on bis-(4-hydroxyphenyl)-2,2-propane (bisphenol A), bis-(4-hydroxy-3,5-dichlorophenyl)-2,2-propane (tetrachlorobisphenol A), bis-(4-hydroxy-3,5-dibromophenyl)-2,2-propane (tetrabromobisphenol A), bis-(4-hydroxy-3,5-dimethylphenyl)-2,2-propane (tetramethylbisphenol A), bis-(4-hydroxyphenyl)-1,1-cyclohexane (bisphenol Z) and on trinuclear bisphenols, such as $\alpha,\alpha'$-bis-(4-hydroxyphenyl)-p-diisopropylbenzene.

Other diphenols suitable for the production of the polycarbonates are described in U.S. Pat. Nos. 2,970,131, 2,991,273, 2,999,835, 2,999,846, 3,028,365, 3,062,781, 3,148,172, 3,271,367 and 3,275,601.

The thermoplastic aromatic polycarbonates are either known from the literature or may be obtained by methods known from the literature.

The graft polymers (B) are the subject of German patent application No. P 37 20 476.9 (Le A 25 250) while the graft base according to B.2 is the subject of German patent application No. P 37 04 655.1 (Le A 25 011).

According to patent application No. P 37 04 655.1, the multiphase polymers serving as the graft base B.2 have average particle diameters of from 0.05 to 10 $\mu$m, preferably from 0.1 to 2 $\mu$m and more preferably from 0.1 to 1 $\mu$m.

The production of the graft polymers (B) to be used in accordance with the invention by way of the graft base B.2) is described in German patent application NO.

P 37 20 476.9, from which the following passages are taken:

The cores (a) of organic, resin-like polymer with softening temperatures (glass temperatures) above 30° C., preferably above 60° C. and more preferably above 90° C. themselves have average particle diameters $d_{50}$) of from 0.05 to 2 μm and more especially from 0.09 to 0.5 μm. They may be uncrosslinked, partially crosslinked or highly crosslinked, particles of uncrosslinked polymer being preferred. The core material (a) is a resin-like homopolymer or interpolymer of at least one olefinically unsaturated polymerizable monomer, more especially α-methyl styrene, acrylonitrile, methacrylonitrile, alkyl methacrylate, maleic imide, vinyl esters of $C_1$–$C_6$ carboxylic acids, olefin, particularly ethylene, vinyl chloride, vinylidene chloride, acrylic acid, methacrylic acid, acrylamide or mixtures thereof.

If desired, relatively small quantities (up to 10% by weight) of butadiene, isoprene, alkylacrylate, maleic acid esters, may be additionally incorporated in the polymers.

Preferred core materials are copolymers based on styrene and/or ā-methyl styrene with methyl methacrylate and/or acrylonitrile, more especially styrene/acrylonitrile copolymers, α-methyl styrene/acrylonitrile copolymers, styrene/methyl methacrylate copolymers and also polymethyl methacrylate.

The material of the shell (b) according to German patent application P 37 20 476.9 is an at least partially crosslinked homopolymer or interpolymer of organosiloxanes consisting essentially of units corresponding to the following general formula

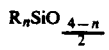  (I)

in which R is an organic radical and n is a number having an average value of 1 to less than 3.

R may be, for example, a monofunctional, saturated $C_1$–$C_{18}$ hydrocarbon radical, such as methyl, ethyl, phenyl, or another monofunctional, optionally substituted hydrocarbon radical which is reactive under the effect of radical formers, more particularly vinyl, allyl, chloroalkyl, mercaptoalkyl, acryloxypropyl. At least 80% of all the radicals R are preferably methyl groups.

The graft overlays (c) present in the graft polymers according to German patent application P 37 20 476.9 are polymers of α,β-unsaturated, polymerizable monomers, preferably vinyl monomers. Suitable monomers are, for example, styrene, α-methyl styrene, p-methyl styrene, halostyrene, acrylonitrile, methacrylonitrile, vinyl halide, maleic imides, maleic acid derivatives, vinyl acetate, vinyl propionate, alkyl (meth)acrylates (containing up to 10 carbon atoms in the alcohol part), vinyl ethers, conjugated dienes, such as butadiene, chloroprene; styrene, acrylonitrile and α-olefins (for example propene, ethylene, butene) are particularly preferred.

The graft overlays (c) may be homopolymers or, preferably, copolymers of at least two of the above-mentioned monomers, for example styrene and acrylonitrile.

The polymers (c) are at least partly grafted onto the silicone rubber, i.e. joined chemically thereto. In particularly preferred graft polymers, more than 40% by weight of the graft overlay is actually grafted on.

The graft polymers according to German patent application P 37 20 476.9 may be prepared as follows:

In the first step, an emulsion of the core material (a) is prepared by dispersion polymerization known per se of one or more monomers, more especially by emulsion polymerization in aqueous medium using radical initiators in the presence of emulsifiers. The diameter of the polymer particles in the emulsion may be regulated through the choice of the polymerization conditions. Polymerization is normally carried out at 30° to 100° C. Preferred emulsions of the core polymer (a) have a pH value below 7 and are prepared with anionic emulsifiers, particularly salts of sulfonic acids or organic sulfates. The ratio of monomer, emulsifier and water used determines the particle diameter of the polymers in the latices thus obtained. To obtain partly or completely crosslinked core material (a), the monomers may be polymerized together with at least one polyfunctional vinyl or allyl monomer, more especially quantities of up to 5% by weight, based on the monomers. Crosslinking polyfunctional monomers are known, preference being attributed to divinylbenzene, bisacrylates, bisacrylamides, vinyl acrylates, triallyl cyanurate, isocyanurate, phosphate, citrate.

In the second step, the organopolysiloxane forming the shell (b) is prepared by emulsion polymerization in the presence of the emulsion of the polymer of the first step by dispersing low molecular weight organosiloxanes in the latex from the first step and polymerizing the resulting dispersion, optionally in the presence of an emulsifier in the quantity required for a stable emulsion and a catalyst. The coarsely dispersed organosiloxane need not be mechanically emulsified, for example in high-speed stirrers, colloid mills or high-pressure homogenizers, before the polymerization. Instead, emulsification and polymerization are preferably carried out at the same time. In this way, the organopolysiloxane formed is, surprisingly, graft-polymerized onto the core material (a) prepared in the first step. In general, polymerization is carried out at 40° to 100° C.

The particle diameters of these core-shell polymers may also be regulated through the choice of the polymerization conditions, for example by using nonionic co-emulsifiers, through the ratio of emulsifier to organosiloxane and through the choice of core materials having suitable particle diameters.

Organosilicon monomers and oligomers for the preparation of (b) are known. Suitable organosilicon monomers and oligomers are inter alia cyclic organosiloxane oligomers, for example octamethyl cyclotetrasiloxane and decamethyl cyclopentasiloxane. Alkoxysilanes and alkoxysiloxanes containing 1 to 4 carbon atoms in the alkoxy group are also suitable, examples including methyl triethoxysilane, 3-aminopropyl trimethoxysilane and 3-mercaptopropyl methyl dimethoxysilane. Also suitable are polysiloxanols, more especially α-ω-polysiloxane diols having molecular weights of from about 2000 to 5000 and a viscosity of 50 to 150 mPa.s at 25° C.

The organopolysiloxane of the shell (b) may be crosslinked in accordance with patent application NO. P 37 20 476.9 through the incorporation of, for example, tetraethoxysilane or a silane corresponding to the following general formula

  (II)

in which X is a hydrolyzable group, more especially the alkoxy radical, and R has the meaning defined for (I). R is preferably methyl and phenyl. However, crosslinking may also take place where, for example, vinyl and mercapto groups used at the same time react with one another in the emulsion polymerization of the siloxane constituents. In that case, there is no need to add an external crosslinking agent.

Known nonionic and/or anionic emulsifiers are used as the emulsifiers.

Examples of nonionic emulsifiers are adducts of ethylene oxide with compounds containing acidic hydrogen, such as fatty alcohols and fatty acids. The HLB value of the emulsifiers should be in the range which promotes the formation of o/w emulsions and is generally $\geq 10$. Suitable nonionic emulsifiers are, for example, POE (3)-lauryl alcohol, POE (20)-oleyl alcohol, POE (7)-nonylphenol and POE (10)-stearate. (The notation POE (3) lauryl alcohol means that three units of ethylene oxide are added onto one molecule of lauryl alcohol, the number 3 representing an average value; the same applies to the other emulsifiers mentioned.).

Suitable anionic emulsifiers are the alkali salts of fatty acids or the alkali, alkaline earth or amine salts of organic sulfonic acids, more especially alkylaryl sulfonic acids, of which examples are the sodium salts of dodecylbenzene sulfonic acid and lauryl sulfonic acid. Mixtures of nonionic emulsifiers and anionic emulsifiers may also be used.

The catalysts used are acids, preferably surface-active acids, of which examples include sulfonic acids, such as alkyl sulfonic acids and alkylaryl sulfonic acids, particularly dodecyl benzenesulfonic acid.

In the polymerization of the shell (b) onto the core (a), the formation of new particles must be completely avoided. Accordingly, the emulsifier should only be present in a quantity just sufficient to cover the surface of the particles. If an agglomerated latex is used in the formation of the core (a) to obtain a graft polymer containing large particles, the graft polymer may contain ungrafted resin particles. The polymerization of the shell (b) may also be conducted in such a way that, in addition to particles having a core-shell structure, particles of pure organopolysiloxane are produced at the same time. It is also possible to use mixtures of both kinds prepared in accordance with P 37 20 476.9.

In the third step of the production process, the monomers forming the graft overlay may be radically polymerized in the presence of the graft polymer of the second step, more especially at 40° to 90° C., resulting in the formation of a second graft shell. This graft polymerization may be carried out in suspension, dispersion or, preferably, in emulsion either continuously or discontinuously. The polymerization is initiated with radical formers (such as peroxides, azo compounds, hydroperoxides, persulfates, perphosphates), the reaction optionally being carried out in the presence of anionic emulsifiers, such as carbonium salts, sulfonic acid salts or organic sulfates. The copolymers are formed in high graft yields, i.e. a large proportion of the polymer (c) formed is joined chemically to the silicone rubber. The graft polymer of the second step (a+b) makes it unnecessary to take special process measures to obtain high graft yields.

The resulting graft polymers of the third step may be worked up by known methods, for example by coagulation of the latices with electrolytes (salts, acids or mixtures thereof), followed by purification and drying. The graft polymers according to German patent application P 37 20 476.9 show surprisingly good properties as thermoplasts, for example ageing stability, thermal stability, particularly during processing to molded articles, surface quality of molded articles produced therefrom, processibility, low-temperature toughness and ultimate strength.

Up to half and preferably up to one third of the thermoplastic polycarbonates (component (A) may be replaced by other thermoplasts (C), preferably by thermoplastic copolymers (C) of C.1 50 to 95 parts by weight and preferably 60 to 80 parts by weight of styrene, α-methyl styrene, nucleus-substituted styrene, methyl methacrylate or mixtures thereof and C.2 50 to 5 parts by weight and preferably 40 to 20 parts by weight (meth)acrylonitrile, methyl methacrylate, maleic anhydride, N-substituted maleic imide or mixtures thereof, the sum of the parts by weight of C.1 and C.2 amounting in each case to 100.

Other thermoplasts (C) are those which are different from components (A) and (B).

It will be apparent that, in the event that when up to one half of the (A) is replaced by (C) as stated above, the molding composition of the invention may be described as containing:

A. 52 to 94% by weight of a component consisting of 50 to 100% by weight of a mixture of one or more polycarbonates and 0–50% by weight of a thermoplastic copolymer (C) composed of C.1 50 to 95 parts by weight of styrene, α-methyl styrene, nucleus-substituted styrene, methyl methacrylate or mixtures thereof, and C.2 50 to 5 parts by weight (meth)acrylonitrile, methyl methacrylate, maleic anhydride, N-substituted maleic imide, or mixtures thereof, the sum of the parts by weight of C.1 and C.2 amounting to 100, B. 6 to 48% by weight of one or more particulate graft polymers wherein the graft polymers are prepared by graft polymering B.1 20 to 90 parts by weight of at least one α, β-unsaturated monomer to form an overlay onto B.2 80 to 10 parts by weight of a graft base having a core/shell structure, consisting of a core of (a) an organic, resin-like polymer of at least one olefinically unsaturated monomer having a glass temperature (Tg) of $>30°$ C. and a shell polymer of (b) cross-linked silicone rubber, the ratio of the core (a) to the shell (b) being from 0.1:99.9 to 90:10, the graft polymer (B) having an average particle diameter of from 0.05 to 10 microns and the sum of the parts by weight of B.1 and B.2 amounting to 100.

Accordingly, the present invention also relates to molding compositions containing (A) 52 to 94% by weight and preferably 60 to 86% by weight of one or more polycarbonates and (B) 6 to 48% by weight and preferably 14 to 40% by weight of one or more of the graft polymers to be used in accordance with the invention, at most half the percentages by weight and preferably at most one third of the percentages by weight of component (A) being replaced by other thermoplasts (C), preferably by thermoplastic copolymers (C), prepared from C.1 50 to 95 parts by weight and preferably 60 to 80 parts by weight styrene, α-methyl styrene, nucleus-substituted styrene, methyl methacrylate or mixtures thereof and C.2 50 to 5 parts by weight and preferably 40 to 20 parts by weight (meth)acrylonitrile, methyl methacrylate, maleic anhydride, N-substituted maleic imide or mixtures thereof, the sum of the parts by weight of C.1 and C.2 amounting to 100 in each case and the sum of the percentages by weight of components (A)+(B)+(C) being 100% by weight in each case.

Preferred copolymers (C) are those of at least one D monomer from the group comprising styrene, o-methyl styrene, nucleus-substituted styrene according to C.1 with at least one monomer from the group comprising acrylonitrile, methacrylonitrile, methyl methacrylate, maleic anhydride, N-substituted maleic imide according to C.2.

Copolymers of the type (C) are also formed as secondary products in the graft polymerization reaction for the preparation of component (B) (see pages 6 and 9 of the present application).

The quantity of copolymer (C) useable in accordance with the invention does not include these secondary products of the graft polymerization reaction.

The copolymers of component (C) are resin-like, thermoplastic and rubber-free. Particularly preferred copolymers (C) are those of styrene and/or α-methyl styrene with acrylonitrile and, optionally, with methyl methacrylate.

Particularly preferred ratios by weight in the thermoplastic copolymer (C) are 60 to 80% by weight C.1 and 40 to 20% by weight C.2.

The copolymers (C) are known and may be prepared by radical polymerization, more especially by emulsion, suspension, solution or mass polymerization. They preferably have molecular weights $\overline{M}w$ (weight average, as determined by light scattering or sedimentation) of from 15,000 to 200,000.

The polycarbonate molding compositions according to the invention may contain other additives known for components (A), (B) or (C), such as stabilizers, pigments, mold release agents, flameproofing agents and/or antistatic agents, in the usual quantities.

The molding compositions according to the invention containing components (A), (B) and, optionally, (C), stabilizers, pigments, mold release agents, flameproofing agents and/or antistatic agents may be prepared by mixing the constituents in known manner and melt-compounding or melt-extruding the resulting mixtures at temperatures of 200° to 330° C. in standard machines, such as internal kneaders, extruders or twin-screw extruders.

Accordingly, the present invention also relates to a process for the production of thermoplastic molding compositions containing components (A), (B) and, optionally, (C), stabilizers, pigments, mold release agents, flameproofing agents and/or antistatic agents, characterized in that the respective constituents are mixed and the resulting mixtures are melt-compounded or melt-extruded in standard machines at temperatures of 200° to 330° C.

The constituents may be mixed gradually or all at once both at around 20° C. (room temperature) and also at higher temperatures.

The molding compositions according to the invention may be used for the production of molded articles of all kinds. In particular, molded articles may be produced by injection molding. Examples of molded articles are parts of housings (for example for domestic appliances, such as juice presses, coffee machines, mixers), cover panels for buildings and car components. They are also used for electrical components, for example multiway connectors, because they show very good electrical properties.

Molded articles may also be produced by deep drawing from prefabricated sheets or films.

Particle size always means the average particle diameter $d_{50}$ as determined by ultracentrifuge measurements in accordance with W. Scholtan et al., Kolloid-Z. und Z. Polymere 250 (1972), 782–796.

EXAMPLES

Polycarbonates and Copolymers (A) Linear polycarbonate based on bisphenol A having a relative solution viscosity $n_{rel}$ of 1.26 to 1.28, as measured on a solution in $CH_2Cl_2$ (concentration 0.5 g/100 ml) at 25° C.

(C) Styrene/acrylonitrile copolymer (styrene:acrylonitrile ratio 72:28) having a limiting viscosity number ($\eta$) of 0.55 dl/g (as measured in dimethylformamide at 20° C.).

Preparation of a graft polymer B to be used in accordance with the invention in accordance with German patent application P 37 20 476.9 (Le A 25 250).

1. Preparation of a Core Material (a)

3000 parts by weight water and 7.5 parts by weight of the Na salt of $C_{14}$–$C_{18}$ alkyl sulfonic acids are introduced into a reactor. After heating with stirring to 63°–65° C., 240 parts by weight of a mixture of 28% by weight acrylonitrile and 72% by weight styrene are introduced into the reactor. After initiation with a solution of 15 parts by weight potassium peroxodisulfate in 150 parts by weight water, the following solutions are introduced into the reactor over a period of 4 hours:

| | |
|---|---|
| Solution 1: | 788 parts by weight acrylonitrile |
| | 2025 parts by weight styrene |
| | 12 parts by weight tert.-dodecyl mercaptan |
| Solution 2: | 2100 parts by weight water |
| | 33 parts by weight Na salt of $C_{14}$–$C_{18}$ alkyl sulfonic acids |

The reaction mixture is polymerized at 65° C. until the latex has a solids content of greater than 36.5% by weight. The resulting latex 1 has a pH value of 3.57 and an average particle diameter $d_{50}$ value) of 0.12 μm. The glass temperature of the core material is 100° C.

2. Preparation of Rubber Particles (a+b)

150 parts by weight of the resin emulsion (1.) and 5.0 parts by weight octamethyl cyclotetrasiloxane are introduced under nitrogen into a reactor. The reaction mixture is heated to 85° C. and stirred for 2 hours.

After addition of a solution of 1.4 parts by weight dodecylbenzene sulfonic acid, 1.4 parts by weight POE (5)-lauryl alcohol and 1.4 parts by weight $C_{12}$–$C_{14}$ alkyl sulfonic acid, sodium salt, in 58 parts by weight water, the mixture is stirred for 1 hour at 80° C. A mixture of 95 parts by weight octamethyl cyclotetrasiloxane, 2.5 parts by weight mercaptopropyl methyl dimethoxysilane and 3.1 parts by weight tetramethyl tetravinyl cyclotetrasiloxane is introduced over a period of 2 hours, the polymerization is completed over a period of 23 hours at 80° C. and the stable emulsion formed (latex 2) is cooled to room temperature. It contains the multiphase polymer in a concentration of 48.7% by weight. The average particle diameter is 0.18 μm. The polymer is partially crosslinked and has a gel content of 58.2%. It consists of 35% by weight styrene/acrylonitrile copolymer and 65% by weight organosiloxane.

3. Graft Polymer B According to the Invention (B.2+B.1)

1540 parts by weight of latex 2 and
1640 parts by weight water
are introduced into a reactor. After initiation with a solution of 7.5 parts by weight potassium peroxodisulfate in 195 parts by weight water at 65° C., the following solutions are uniformly introduced into the reactor over a period of 4 hours:

| Solution 1: | 540 parts by weight styrene |
| | 210 parts by weight acrylonitrile |
| Solution 2: | 375 parts by weight water |
| | 15 parts by weight sodium salt of $C-C_{18}$ alkyl sulfonic acids |

The mixture is then polymerized to completion in 4 hours at 65° C. The monomer conversion amounts to more than 98% by weight. A latex having a solids content of approximately 33% by weight is obtained. After coagulation with an aqueous magnesium sulfate solution, filtration and drying in vacuo, the graft polymer is obtained in the form of a white powder. The rubber content amounts to 32.5% by weight.

4. Comparison Graft Polymer B*

An ASA graft polymer of 60% by weight coarse, highly crosslinked particulate acrylate rubber and 40% by weight of a styrene/acrylonitrile mixture in a ratio by weight of 72:28, average particle size ($d_{50}$) approx. 400 nm. The product was prepared by emulsion polymerization using known methods, as described for example in EP 34 748 (pages 8 et seq.).

5. Preparation of the Molding Compositions According to the Invention

Components A. B. and C. were compounded in a 3 liter internal kneader at temperatures of 200° to 220° C.
The molded articles were prepared in an injection molding machine at 260° C.
Notched impact strength was measured by the Izod method on bars measuring 2.5×½×⅛″ in accordance with ASTM-D-256.
As shown in the following Table, the molding compositions according to the invention show higher low-temperature than the comparison molding compositions despite their lower overall rubber content. The weather resistance of both molding compositions is good.

| Components (% by weight) | | | | Notched impact strength (J/m) | | |
| --- | --- | --- | --- | --- | --- | --- |
| A | B | B* | C | room temperature | −20° C. | −50° C. |
| According to the invention | | | | | | |
| 60 | 24 | | 16 | 726 | 525 | 437 |
| Comparison | | | | | | |
| 60 | | 20 | 20 | 620 | 287 | — |

The total rubber content of the molding composition is 7.8% by weight, that of the comparison molding composition 12% by weight.

We claim:
1. A thermoplastic molding composition containing:
   A. 52 to 94% by weight of a component consisting of 50 to 100% by weight of a mixture of one or more polycarbonates and 0–50% by weight of a thermoplastic copolymer (C) composed of
   C.1 50 to 95 parts by weight of styrene, α-methyl styrene, nucleus-substituted styrene, methyl methacrylate or mixtures thereof, and
   C.2 50 to 5 parts by weight (meth)acrylo-nitrile, methyl methacrylate, maleic anhydride, N-substituted maleic imide, or mixtures thereof, the sum of the parts by weight of C.1 and C.2 amounting to 100,
   B. 6 to 48% by weight of one or more particulate graft polymers wherein the graft polymers are prepared by graft polymering
   B.1 20 to 90 parts by weight of a polymer graft overlay of at least one α, β-unsaturated monomer to form an overlay onto
   B.2 80 to 10 parts by weight of a graft base having a core/shell structure, consisting of a core of
      (a) an organic, resin-like polymer of at least one olefinically unsaturated monomer having a glass temperature (Tg) of >30° C. and a shell polymer of
      (b) cross-linked silicone rubber, the ratio of the core (a) to the shell (b) being from 0.1:99.9 to 90:10, the graft polymer (B) having an average particle diameter of from 0.05 to 10 microns and the sum of the parts by weight of B.1 and B.2 amounting to 100.
2. A molding composition as claimed in claim 1 wherein the amount of weight of (C) in (A) is not more than one third of the percent by weight of (A) in the composition.

* * * * *